(12) United States Patent
Boyle et al.

(10) Patent No.: US 8,121,222 B2
(45) Date of Patent: Feb. 21, 2012

(54) SYSTEMS AND METHODS FOR CONSTRUCTION OF TIME-FREQUENCY SURFACES AND DETECTION OF SIGNALS

(75) Inventors: Frank A. Boyle, Melissa, TX (US); Gerald L. Fudge, Rockwall, TX (US); Chen-Chu A. Yeh, Rockwall, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 901 days.

(21) Appl. No.: 12/214,897

(22) Filed: Jun. 23, 2008

(65) Prior Publication Data
US 2010/0002777 A1 Jan. 7, 2010

(51) Int. Cl.
*H03K 9/00* (2006.01)
(52) U.S. Cl. ...................................................... 375/316
(58) Field of Classification Search .................. 375/316, 375/324, 355
See application file for complete search history.

(56) References Cited

U.S. PATENT DOCUMENTS

| | | | |
|---|---|---|---|
| 7,444,128 B1* | 10/2008 | Nelson | 455/226.1 |
| 2006/0209988 A1* | 9/2006 | Rho et al. | 375/324 |
| 2007/0081578 A1 | 4/2007 | Fudge et al. | |
| 2007/0081611 A1 | 4/2007 | Fudge et al. | |
| 2007/0081617 A1 | 4/2007 | Fudge | |
| 2007/0086544 A1* | 4/2007 | Fudge et al. | 375/316 |
| 2007/0177699 A1* | 8/2007 | Fite et al. | 375/355 |
| 2008/0013653 A1 | 1/2008 | Fudge et al. | |

OTHER PUBLICATIONS

Wigner, "On the Quantum Correction for Thermodynamic Equilibrium", Physical Review Online Archive, The American Physical Society, Printed From Internet Mar. 18, 2008, 2 pgs.
"Time-Frequency Analysis Methods, Including the Wigner-Villa Distribution: Applications to Transient Signals", Printed From Internet Mar. 18, 2008, 13 pgs.
Donoho et al., "Compressed Sensing", Department of Statistics, Stanford University, Sep. 14, 2004, 34 pgs.
Candes et al., "Robust Uncertainty Principles: Exact Signal Reconstruction From Highly Incomplete Frequency Information", Jun. 2004 and Aug. 2005, 41 pgs.
Cohen, "Time-Frequency Distributions—A Review", Proceedings From the IEEE, vol. 77, No. 7, Jul. 1989, pp. 941-981.
Wikipedia, "Short-Time Fourier Transform", Printed From Internet Jun. 12, 2008, 9 pgs.
Ville, "Theorie Et Applications De La Notion De Signal Analytique", Cables et Transmission, vol. 2A, 1948, pp. 61-77, (English translation see C9).
Pace, "Detecting And Classifying Low Probability Of Intercept Radar", Artech House, 2004, 3 pgs.
Ville, "Theory And Application Of The Notion Of Complex Signal", Rand Corp., Aug. 1, 1958, 35 pgs.

* cited by examiner

*Primary Examiner* — Jaison Joseph
(74) *Attorney, Agent, or Firm* — O'Keefe, Egan, Peterman & Enders LLP

(57) ABSTRACT

Systems and methods for detecting and/or identifying signals that employ streaming processing to generate time-frequency surfaces by sampling a datastream according to a temporal structure that may be chosen as needed. The sampled datastream may be correlated with a set of templates that span the band of interest in a continuous manner, and used to generate time-frequency surfaces from irregularly sampled data with arbitrary structure that has been sampled with non-constant and non-Nyquist sampling rates where such non-constant rates are needed or desired.

24 Claims, 10 Drawing Sheets

SYSTEMS AND METHODS FOR CONSTRUCTION OF TIME-FREQUENCY SURFACES AND DETECTION OF SIGNALS

This invention was made with United States Government support under Contract No. FA8650-06-C-7611. The Government has certain rights in this invention.

FIELD OF THE INVENTION

This invention relates generally to signal processing, and more particularly, to time-frequency analysis.

BACKGROUND OF THE INVENTION

Time-frequency analysis has been used for detection and classification of features in electromagnetic (EM) data by generating time-frequency surfaces. Most techniques that exist for generating such surfaces assume a constantly-spaced sample structure. Further, most existing methods (e.g., Wigner-Ville, Short Time Fourier Transform STFT) employ batch mode processing, which results in some latency in real-time processing.

There is current interest in techniques that enable high-bandwidth data acquisition with limited sampling capability. This has led to exploration of nonconstant sampling and compressed sensing techniques for collecting relevant data structures. Many of the extant time-frequency analysis tools (e.g., MATLAB) will require a conversion of such data to conventional Nyquist sampling. Generally the problem is approached by using analog to digital (A/D) and analysis hardware that will support the necessary sample rates. Optimization of algorithms that perform constantly-spaced time-frequency analysis (e.g., fast fourier transform of the west "FFTW") allows for the handling of greater amounts of data. These approaches generally require high sampling rates and do not address the case where Nyquist sampling is not possible.

A wide variety of signals and related protocols exist for the use of radio frequency (RF) signals in communication systems and other devices, such as radar systems. In some applications, it is desirable to determine or confirm the existence of RF signals and accurately measure their parameters. RF signals of interest, however, can occur across a wide range of center frequencies with various bandwidths and can be relatively small in amplitude compared to background noise. As such, it is desirable for an RF receiver to be designed to acquire and allow the detection and measurement of signals across a wide frequency range with various bandwidths while contributing little distortion, spurs or interference from its own circuitry. For a electronic intelligence application, for example, the desired signals to be acquired and detected can fall within a frequency range from less than 2 GHz to greater then 20 GHz. To provide reasonable sensitivity against a variety of signal types and bandwidths while maximizing search coverage, typical instantaneous search bandwidths may range from 100 MHz or less to 1 GHz or greater.

Many receiver architectures currently exist for receiving and detecting RF signals. These architectures include heterodyne receivers, homodyne receivers (also called zero-IF and direct conversion receivers for intermediate frequency (IF) applications), low-IF receivers, double conversion wideband IF receivers, wideband digital receivers, 6-port receivers (a special case of homodyne receivers), 3-phase variations of homodyne receivers, charge-domain direct RF mixer-sampler receivers, compressive receivers, noise-shaping sigma-delta receivers, non-reconfigurable direct RF optical down-sampling receivers, bandpass sampling variations of heterodyne receivers, and optical tuned channelized filters for fiberoptic WDM (wavelength division multiplexed) receivers. In addition, multi-signal bandpass sampling receivers combining the outputs from multiple bandpass filters without tuning have been proposed. In addition, noise-shaping sigma delta converters that use a bank of bandpass filters to implement a tuning function with a modulation sampling clock meeting the Nyquist criteria for the total frequency range of interest have been designed. In addition, direct RF receivers based on the use of analog high-speed pre-samplers have been built, although not in any reconfigurable architecture. Still further, combination architectures have been utilized such as a combination of switched homodyne receiver and low-IF receiver architectures.

For wideband applications, sampling at the Nyquist rate of at least twice the bandwidth can be very difficult because of device limitations, power consumption, size, weight, and cost. In order to avoid these difficulties, sub-Nyquist sampling schemes have been proposed including various non-uniform sampling techniques for harmonic retrieval and some recent methods in compressive sensing (also referred to as compressive sampling). Non-uniform sampling techniques proposed to date have, however, been limited in the types of signals that can be processed (generally extremely narrowband signals), number of simultaneous signals (one or two typically), and total decimation ratio (typically $1/5$ to $1/10$ Nyquist at best). Compressive sensing techniques suffer from numerous challenges, including device implementation, computational complexity in their reconstruction modules, and signal reconstruction.

Each of these prior architectures suffer certain disadvantages and, therefore, have not been entirely effective in receiving and detecting RF signals, particularly in applications requiring reconfigurability for variable signal environment; the ability to reconstruct the signal; reasonable sensitivity; low size, weight, cost, and power; large frequency range of interest that may span many GHz; including applications such as radar warning receivers, electronic support receivers, electronic support measures receivers, electronic intelligence, communications intelligence, and ultra wideband radar receiver applications.

SUMMARY OF THE INVENTION

The disclosed systems and methods employ streaming processing to detect and/or identify signals by generating time-frequency surfaces with substantially no processing latency and/or without requiring constant sampling by sampling a datastream according to a temporal structure that may be chosen as needed, e.g., depending on sampling limitations and/or required bandwidth. The sampled datastream may then be correlated with a set of templates that span the band of interest. In one embodiment, the disclosed systems and methods may be used to generate time-frequency surfaces (e.g., a waterfall display of time versus frequency) from irregularly sampled data with arbitrary structure, and without requiring conventional spectral analysis tools (e.g., Wigner-Ville, short-time fourier transform "STFT") that assume Nyquist sampling. In another embodiment, the disclosed systems and methods may be configured for continuous implementation (e.g., for real time implementation in a streaming manner) given sufficient computational power. Advantageously, the disclosed systems and methods may utilize non-constant sampling to perform time-frequency analysis at lower data acquisition rates than is required for conventional constant sampling methods. In one exemplary embodiment, a receiving/signal detection system may be provided that is capable of extracting time dependent spectral features from arbitrarily-sampled data.

The disclosed systems and methods may be implemented with any apparatus and/or system configured to receive signals of any frequency range or band suitable for propagation through a variety of media types including, but not limited to, gaseous medium (e.g., air), solid medium (e.g., earth, tissue), vacuum, etc. Examples of such signals include, but are not limited to, electromagnetic (EM) signals, acoustic signals, etc. For example, the disclosed systems and methods may be implemented for applications such as radar surveillance, acoustic surveillance, oil and gas exploration, medical imaging, etc. Examples of types of apparatus and systems that may be implemented with the disclosed methods and systems include, but are not limited to, apparatus and systems having signal-receiving sensors configured in the form of radio frequency (RF) antennas, phased array RF antennas or beamformers, microphones, sonar arrays (for transmitting/receiving acoustic signals), ultrasonic arrays (ultrasonic signals for medical and flaw analysis imaging purposes), radar arrays (e.g., for bi-static and mono-static radar), mobile and land based telecommunications devices, seismic arrays, etc.

Examples of specific types of phased array RF antennas that may be implemented with the disclosed methods and systems include, but are not limited to, narrow band phased array antennas, broad band phased array antennas, etc. In one embodiment, the disclosed methods and systems may be implemented at any RF frequencies where phased array antennas may be employed (e.g., HF band, KA band, M band, etc.) In another exemplary embodiment, the disclosed methods and systems may be employed in surveillance applications (e.g., airborne, ship-based, space-based, submarine based, etc.) including, but not limited to, as a part of a tactical reconnaissance system.

In one respect, disclosed is a signal receiving and processing system, including sampling circuitry and time-frequency (TF) generator circuitry. The sampling circuitry of one embodiment may be configured to receive an analog input datastream and to sample a set of samples from the analog input datastream to form a sampled datastream, and may also be configured to output a digital output signal that includes the sampled datastream and the sample times for each of the samples contained in the sampled datastream. The time-frequency (TF) generator circuitry of one embodiment may be coupled to receive the digital output signal from the sampling circuitry, and may be further configured to: (a) extract a first window of samples from the sampled datastream such that the first window of samples only contains a first portion of the samples of the datastream and such that each of the samples of the first window having a sample measurement D(t) and a sample time associated therewith, (b) construct a first set of time-frequency templates T(f,t) such that each individual template of the first set of time-frequency templates T(f,t) is constructed for a given template frequency versus the sample times of the samples contained within the extracted first window of samples, (c) compare the set of sample measurements D(t) from the first window of samples to each of the time-frequency templates of the first set of time-frequency templates T(f,t) by correlating the set of sample measurements D(t) from the first window with each of the time-frequency templates of the first set of time-frequency templates T(f,t), and (d) determine a correlation amplitude based on the comparison for each given one of the time-frequency templates of the first set of time-frequency templates T(f,t) such that the correlation amplitude represents the degree of correlation between each given one of the first set of time-frequency templates T(f,t) and the set of sample measurements D(t) from the first window relative to the degree of correlation between other of the time-frequency templates of the first set of time-frequency templates T(f,t) and the set of sample measurements D(t) from the first window.

In another respect, disclosed herein is a signal receiving and processing system, including sampling circuitry and time-frequency (TF) generator circuitry. The sampling circuitry of one embodiment may be configured to receive an analog input datastream and to sample a set of samples from the analog input datastream to form a sampled datastream. The sampling circuitry may also be configured to output a digital output signal that includes the sampled datastream and the sample times for each of the samples contained in the sampled datastream. The TF generator circuitry of one embodiment may be coupled to receive the digital output signal from the sampling circuitry, and may be further configured to: (a) divide the first window of samples into at least two smaller sets of samples, (b) construct a first set of time-frequency templates T(f,t) such that each individual template of the first set of time-frequency templates T(f,t) is constructed for a given template frequency versus the sample times of the samples contained within a first one of the smaller sets of samples, (c) construct a second set of time-frequency templates T(f,t) such that each individual template of the second set of time-frequency templates T(f,t) is constructed for a given template frequency versus the sample times of the samples contained within a second one of the smaller sets of samples, (e) compare the set of sample measurements D(t) from the first smaller set of samples to each of the time-frequency templates of the first set of time-frequency templates T(f,t) by correlating the set of sample measurements D(t) from the first smaller set of samples with each of the time-frequency templates of the first set of time-frequency templates T(f,t), (f) compare the set of sample measurements D(t) from the second smaller set of samples to each of the time-frequency templates of the second set of time-frequency templates T(f,t) by correlating the set of sample measurements D(t) from the second smaller set of samples with each of the time-frequency templates of the second set of time-frequency templates T(f,t), (g) determine a correlation amplitude based on the comparison for each given one of the time-frequency templates of the first set of time-frequency templates T(f,t) such that the correlation amplitude represents the degree of correlation between each given one of the first set of time-frequency templates T(f,t) and the set of sample measurements D(t) from the first smaller set of samples to the degree of correlation between other of the time-frequency templates of the first set of time-frequency templates T(f,t) and the set of sample measurements D(t) from the first smaller set of samples, (h) determine a correlation amplitude based on the comparison for each given one of the time-frequency templates of the second set of time-frequency templates T(f,t) such that the correlation amplitude representing the degree of correlation between each given one of the second set of time-frequency templates T(f,t) and the set of sample measurements D(t) from the second smaller set of samples to the degree of correlation between other of the time-frequency templates of the second set of time-frequency templates T(f,t) and the set of sample measurements D(t) from the second smaller set of samples, and (i) incoherently adding together the correlation amplitudes determined in steps (g) and (h).

In another respect, disclosed herein is a method of time-frequency (TF) processing input signal data, including: (a) receiving the input signal data; (b) utilizing sampling circuitry to sample the input signal data to form a datastream of sampled data; (c) utilizing sampling circuitry to extract a first window of samples from the datastream, the first window of samples containing only a first portion of the samples of the datastream and each of the samples of the first window having a sample measurement D(t) and a sample time associated therewith; (d) constructing a first set of time-frequency templates T(f,t), each individual template of the first set of time-frequency templates T(f,t) being constructed for a given template frequency versus the sample times of the samples contained within the extracted first window of samples; (e) comparing the set of sample measurements D(t) from the first window of samples to each of the time-frequency templates of the first set of time-frequency templates T(f,t) by correlating the set of sample measurements D(t) from the first window with each of the time-frequency templates of the first set of time-frequency templates T(f,t); and (f) determining a correlation amplitude based on the comparison for each given one of the time-frequency templates of the first set of time-frequency templates T(f,t), the correlation amplitude representing the degree of correlation between each given one of the first set of time-frequency templates T(f,t) and the set of sample measurements D(t) from the first window relative to the degree of correlation between other of the time-frequency templates of the first set of time-frequency templates T(f,t) and the set of sample measurements D(t) from the first window. In one embodiment, steps (d) through (f) may be performed by utilizing TF generator circuitry.

In another respect, disclosed herein is a method of time-frequency (TF) processing input signal data, including: (a) receiving the input signal data; (b) sampling the input signal data to form a datastream of sampled data; (c) utilizing sampling circuitry to extract a first window of samples from the datastream, the first window of samples containing only a first portion of the samples of the datastream and each of the samples of the first window having a sample measurement D(t) and a sample time associated therewith; (d) dividing the first window of samples into at least two smaller sets of samples; (e) constructing a first set of time-frequency templates T(f,t), each individual template of the first set of time-frequency templates T(f,t) being constructed for a given template frequency versus the sample times of the samples contained within a first one of the smaller sets of samples; (f) constructing a second set of time-frequency templates T(f,t), each individual template of the second set of time-frequency templates T(f,t) being constructed for a given template frequency versus the sample times of the samples contained within a second one of the smaller sets of samples; (g) comparing the set of sample measurements D(t) from the first smaller set of samples to each of the time-frequency templates of the first set of time-frequency templates T(f,t) by correlating the set of sample measurements D(t) from the first smaller set of samples with each of the time-frequency templates of the first set of time-frequency templates T(f,t); (h) comparing the set of sample measurements D(t) from the second smaller set of samples to each of the time-frequency templates of the second set of time-frequency templates T(f,t) by correlating the set of sample measurements D(t) from the second smaller set of samples with each of the time-frequency templates of the second set of time-frequency templates T(f, t); (i) determining a correlation amplitude based on the comparison for each given one of the time-frequency templates of the first set of time-frequency templates T(f,t), the correlation amplitude representing the degree of correlation between each given one of the first set of time-frequency templates T(f,t) and the set of sample measurements D(t) from the first smaller set of samples to the degree of correlation between other of the time-frequency templates of the first set of time-frequency templates T(f,t) and the set of sample measurements D(t) from the first smaller set of samples; (j) determining a correlation amplitude based on the comparison for each given one of the time-frequency templates of the second set of time-frequency templates T(f,t), the correlation amplitude representing the degree of correlation between each given one of the second set of time-frequency templates T(f,t) and the set of sample measurements D(t) from the second smaller set of samples to the degree of correlation between other of the time-frequency templates of the second set of time-frequency templates T(f,t) and the set of sample measurements D(t) from the second smaller set of samples; and (k) incoherently adding together the correlation amplitudes determined in steps (i) and (j). In one embodiment, steps (d) through (k) may be performed by utilizing TF generator circuitry.

DESCRIPTION OF ILLUSTRATIVE EMBODIMENTS

Figure 1:
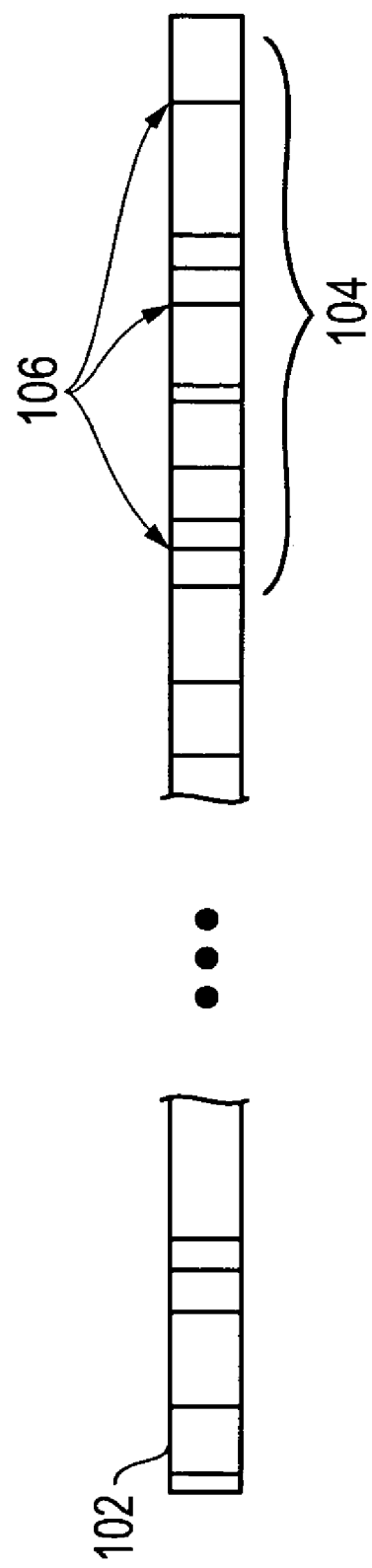
FIG. 1 is a simplified block diagram of a sampled datastream according to one exemplary embodiment of the disclosed systems and methods.

FIG. 1 illustrates a sampled datastream 102 in the form of input data versus time. As shown in FIG. 1, datastream 102 is made up of nonconstantly-spaced (e.g., random or otherwise nonconstantly sampled) sample intervals 106 in time. Input signal data (e.g., electromagnetic signal data such as RF signal data, acoustic signal data, etc.) of datastream 102 may be collected continuously and in real time from any suitable signal source including, but not limited to, electromagnetic (e.g., radio frequency) antenna or phased array antenna or beamformer, microphone or sonar array, ultrasonic array, radar array, seismic array, etc. Input signal data may be analog signal data or previously digitized data stream. A current integration time window 104 is also shown that includes a number of the random (e.g., randomly subsampled) or otherwise nonconstant samples. Samples may be contiguous samples from a datastream or may be non-contiguous samples taken from a datastream for which the time for each sample is known. The selection of integration window 104 will be described further herein.

Figure 2:
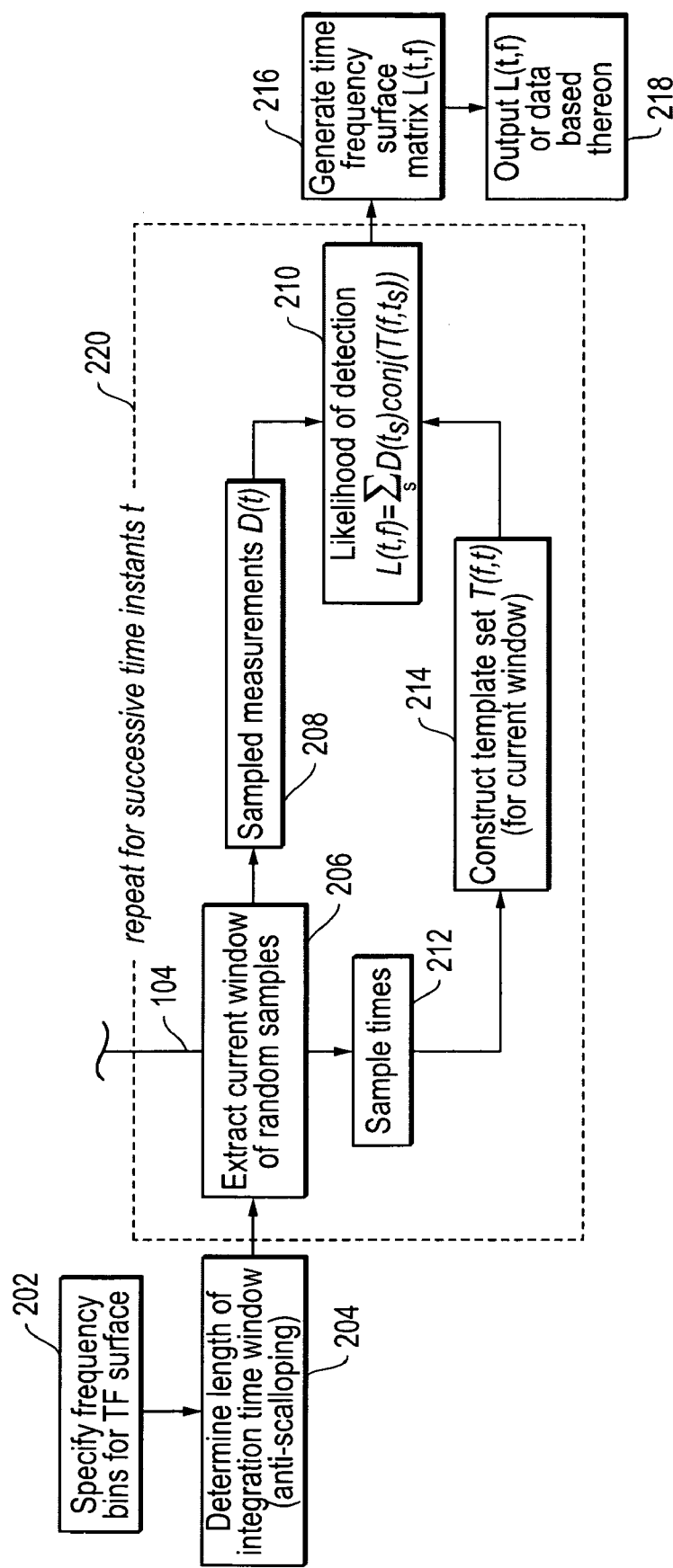
FIG. 2 is a flowchart of methodology that may be implemented according to one exemplary embodiment of the disclosed systems and methods.

FIG. 2 illustrates methodology 200 as it may be implemented according to one exemplary embodiment of the disclosed systems and methods to process a randomly sampled or otherwise non-constantly sampled (e.g., randomly, pseudo-randomly, chirped, etc.) data stream, for example, to produce information concerning likelihood of detection of a signal within the data stream, to generate autodetected signal frequency information indicating detection of a signal within the datastream at the given frequency, and/or to construct a time-frequency surface matrix L(t,f) for output (e.g., to a user via display and/or print-out, to storage media, to further processing components for further processing, etc.). As shown in FIG. 2, a set of frequency bins for analysis is selected in step 202. A length of an integration window 104 is then determined in step 204 based on the frequency bin widths selected in step 202. In one embodiment, the integration length may be selected to balance processing gain against scalloping loss, which is defined as the loss in response between bin centers. This embodiment is described further hereinbelow, and longer integration length results in greater gain but greater scalloping loss. As will be further described herein, the time-frequency surface L(t,f) may be a matrix of frequency intensity versus time constructed by parallel correlation of the randomly or non-constantly sampled data with a set of templates, sampled according to the same structure. It will be understood that although use of a randomly sampled or otherwise non-constantly sampled data stream is illustrated and described with relation to FIGS. 1 and 2, the disclosed systems and methods may also be successfully implemented in the same manner but instead using a constantly sampled data stream rather than a non-constantly sampled data stream.

Figure 3:
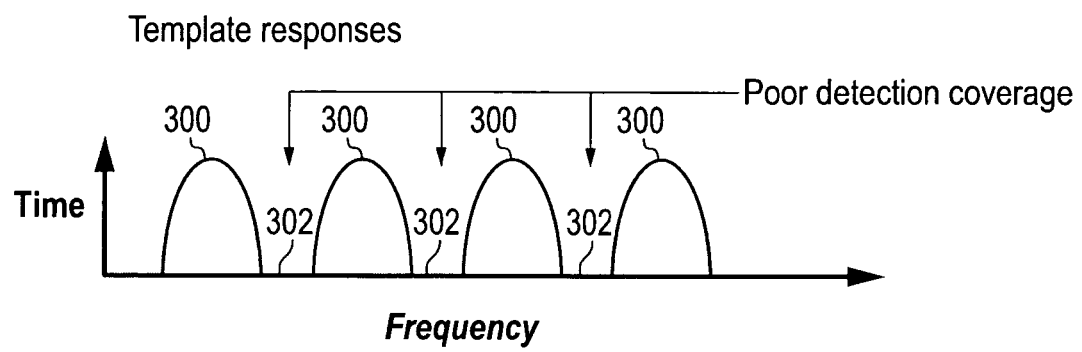
FIG. 3 illustrates time versus frequency for a first length of integration time window according to one exemplary embodiment of the disclosed systems and methods.
Figure 4:
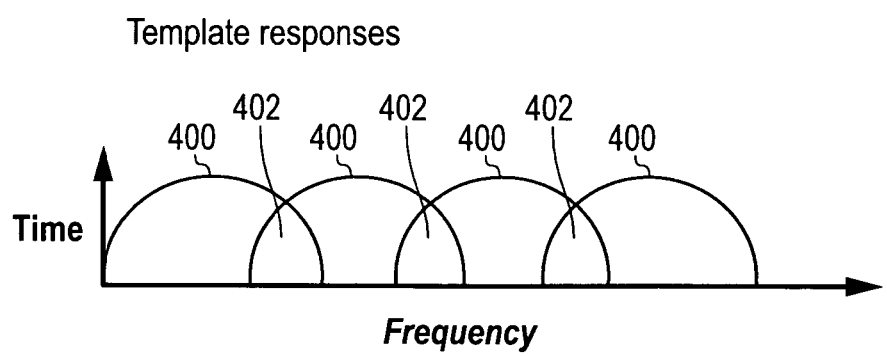
FIG. 4 illustrates time versus frequency for a second length of integration time window according to one exemplary embodiment of the disclosed systems and methods.

In one exemplary embodiment template bandwidths may be selected in step 204 to reduce or substantially eliminate scalloping losses that may occur, in which a source may be undetectable if it's frequency lies somewhere between two of the template frequencies as illustrated in FIG. 3 which shows response of a set of matched filters, with scalloping loss due to frequency spacing 302 occurring between adjacent relatively long integration windows 300. In such a case, scalloping loss represents the lack of response between neighboring matched filter center frequencies, causing signals that do not line up with the filter frequencies to become undetectable. FIG. 4 shows one exemplary embodiment in which scalloping loss has been reduced by limiting integration time by processing shorter time segments with shorter filters, i.e., by shortening integration time to create window overlap 402 between adjacent integration windows 400. The bandwidth of a time-limited continuous wave (CW) series is inversely proportional to it's time duration. Therefore, the bandwidth of a frequency template's response may be controlled by adjusting its time duration. The strategy in such an embodiment is to mitigate scalloping loss by adjusting the lengths of the templates in a bank of matched filters so as to adjust the time duration to the point where, as a signal is lost by one template, it is picked up by the neighboring template.

Given a library of templates, it may be determined how the system will respond to a signal in between two of the templates, e.g., how a detector will respond to a signal at an intermediate frequency such as (f1+f2)/2 for neighboring CW templates with frequencies f1 and f2. In a case where the response drops off too rapidly between frequencies, there may result a significant amount of scalloping loss, leaving some CW signals undetectable. One possible remedy for scalloping loss is to coarsen the frequency response of the template components by limiting their bandwidths. For CS projection, this may be effected by coarsening the CS matrix. For one-channel decimation methods, coarsening may be accomplished by limiting the length of the time segment to increase the bandwidth.

In one exemplary embodiment, the likelihood of signal detection L may be expressed as follows:

$$L(f) = \sum_{s=1}^{N} D(t_s) conj(T(f, t_s))$$

where f is the template frequency index, $t_s$ is the time sample index, D(t) is the signal measurement, $T(f,t_s)$ is the template, and N is the number of samples within the time window.

For detection of CW tones, the templates describe unit-amplitude CW's at frequencies spanning the band of interest:

$$T(f,t_s) = \exp(i2\pi f t_s)$$

We are interested in the case where the data $D(t_s)$ contains a CW component whose frequency $f_0$ differs from that of the nearest template (f). Consider the simple case without noise or interference:

$$D(t_s) = |D|\exp(i2\pi f_0 t_s)\exp(i\phi)$$

where $\phi$ is the phase of the tone contained in the data.
Upon making substitutions, L(f) becomes:

$$L(f) = |D|\exp(i\phi)\sum_{s=1}^{N} \exp(i2\pi \Delta f t_s)$$

where $\Delta f = (f_0 - f)$ is the mismatch between the template frequency and the signal.

If the sample set is dense enough, a continuous integral expression for L(f) may be used:

$$L(f) = |D|\exp(i\phi)\int_{t=0}^{t=\tau} \exp(i2\pi \Delta f t)\, dt$$

For the case where there is no mismatch between signal and template, $\Delta f=0$ and the expression simplifies to:

$$L(f_0) = |D|\exp(i\phi)\tau$$

The loss in response, relative to the no-mismatch case (where the signal matches the template) is:

$$S = \left|\frac{L(f)}{L(f_0)}\right| = \left|\int_{t=0}^{t=\tau} \exp(i2\pi \Delta f t)\, dt\right|$$

Scalloping loss describes the loss in response at frequencies that bisect bin centers. The above expression describes the scalloping loss between two bins separated in frequency by $2\Delta f$. For example, given a scalloping loss of 50%, $\tau$ and $\Delta f$ may be related according to the following expression:

$$\frac{1}{2} = \left|\int_{t=0}^{t=\tau} \exp(i2\pi \Delta f t)\, dt\right|$$

Numerical evaluation of this expression results in the following relationship between $\tau$ and $\Delta f$:

$$\tau = \frac{0.604}{\Delta f}$$

With regard to the previous discussion, it will be understood that shortening filter length widens sensitivity at the cost of reduced sensitivity, which may adversely affect the ability to detect weak signals in the presence of noise or interference. In an alternative exemplary embodiment, a longer integration window may be selected to process longer time segments with greater sensitivity while at the same time reducing or substantially eliminating scalloping loss by maintaining the bandwidth of the filters. In such a case, the longer time segments may be divided into smaller short blocks of data which are then each processed with a corresponding short-time matched filter set, and the results then added up incoherently. Such an embodiment may be implemented to achieve a result that recovers a significant portion of the sensitivity that would be otherwise lost due to shortening the filter lengths. The number of blocks that may be so added up depends on how fast data structures vary over time.

Following step 204 of FIG. 2, steps 206, 208, 210, 212 and 214 may be performed one or more times (e.g., for successive time instants t). Specifically, a window 104 of non-constantly spaced samples that is equal in duration to the selected time integration window (e.g., integration time window 104 of FIG. 2) is extracted from the non-constantly sampled datastream 102 along with the respective sample times of these non-constantly spaced samples in step 206. The window 104 includes a subset (or only a portion) of the non-constant samples of datastream 102. The sample times of the non-constantly spaced samples within window 104 are collected in step 212, and then used to construct a template set (f,t) for the current integration time window 104 in step 214, with a set of templates being formed for each frequency bin according to the actual sample times of step 212. In one embodiment, each template may be constructed based on actual sample times and a template frequency, and such that a group of template frequencies are selected to build a library of templates that span the frequency surveillance band being interrogated and such that the templates overlap, e.g., the frequency band of interrogation may be divided by equally spaced frequency bins forming a dense enough pattern such that each frequency bin overlaps at least two signals. Actual sampled measurements D(t) are collected in step 208 and then the collected actual sample set of step 208 is compared in step 210 to the constructed template set of step 214.

In this embodiment, the template set of step 214 is a family of waveforms, represented at the time instances 212 of the current window of samples 104. Each of these waveforms is a model of a CW signal at a certain frequency. The frequency set represented by the template set is selected to span a band of interest (the surveillance band). Generally, the frequency bins will be equally spaced, but non-equally spaced configurations can be advantageous in some circumstances (for example when a portion of the surveillance band is not of interest). The number of frequency bands available will depend on hardware limitations (e.g., buffer size, processing power) and latency requirements.

Based on the comparison of step 210, it is determined if the frequency of one of the templates matches an actual signal that is contained within the actual sampled measurements of step 208. For example, the results of the correlation performed in step 210 each time may be optionally output as a score (e.g., value) or other suitable indicator that represents the degree of correlation amplitude between a given template and the sampled measurements. Thus, the output score is information that represents a measure of the likelihood of detection for each template, and the frequency of the template generating the greatest degree of correlation among a group of compared template frequencies may be selected as the actual signal frequency. In one exemplary embodiment, steps 206, 208, 212 and 214 may be repeated for successive time increments t, and the correlation results of successive time windows may be processed and stacked in step 216, producing a time-frequency surface matrix L(t,f) from the non-constantly spaced input data of step 206. If necessary, input sample sets can be overlapped in time to better handle transient signals.

Still referring to the methodology of FIG. 2, a time-frequency surface matrix L(t,f) may be generated in step 216 from a plot of multiple likelihood of detection scores versus time and frequency bins as determined in step 210, e.g., based on stacking the correlation of templates with data of each iteration as for the exemplary embodiment described above or by using any other suitable methodology. In optional step 218, a time-frequency surface matrix L(t,f) or data based thereon (e.g., time average of the TF surface) may be, for example, displayed to a user, stored on one or more storage media, output to processing components for further processing (e.g., for autodetection purposes), etc. The presence of one or more signals within input signal data and detected by the disclosed systems and methods may be indicated in the generated time-frequency surface matrix L(t,f) as one or more lines overlaying the background in the generated time-frequency surface matrix L(t,f) (e.g., see FIGS. 6A, 7A, 8A), or as spikes on a time average of L(t,f) (e.g., see FIGS. 6B, 7B, 8B). In this regard, data from such a time-frequency surface matrix L(t,f) may be analyzed by a human user and/or processed by algorithm to detect and identify the signals. In another embodiment, one or more signals contained within an input datastream may be autodetected based on results of comparison between the collected actual sampled measurements D(t) and the constructed template set T(f,t), and optionally so indicated to a user, e.g., via output frequency value or other suitable information for identifying the signal.

Figure 5:
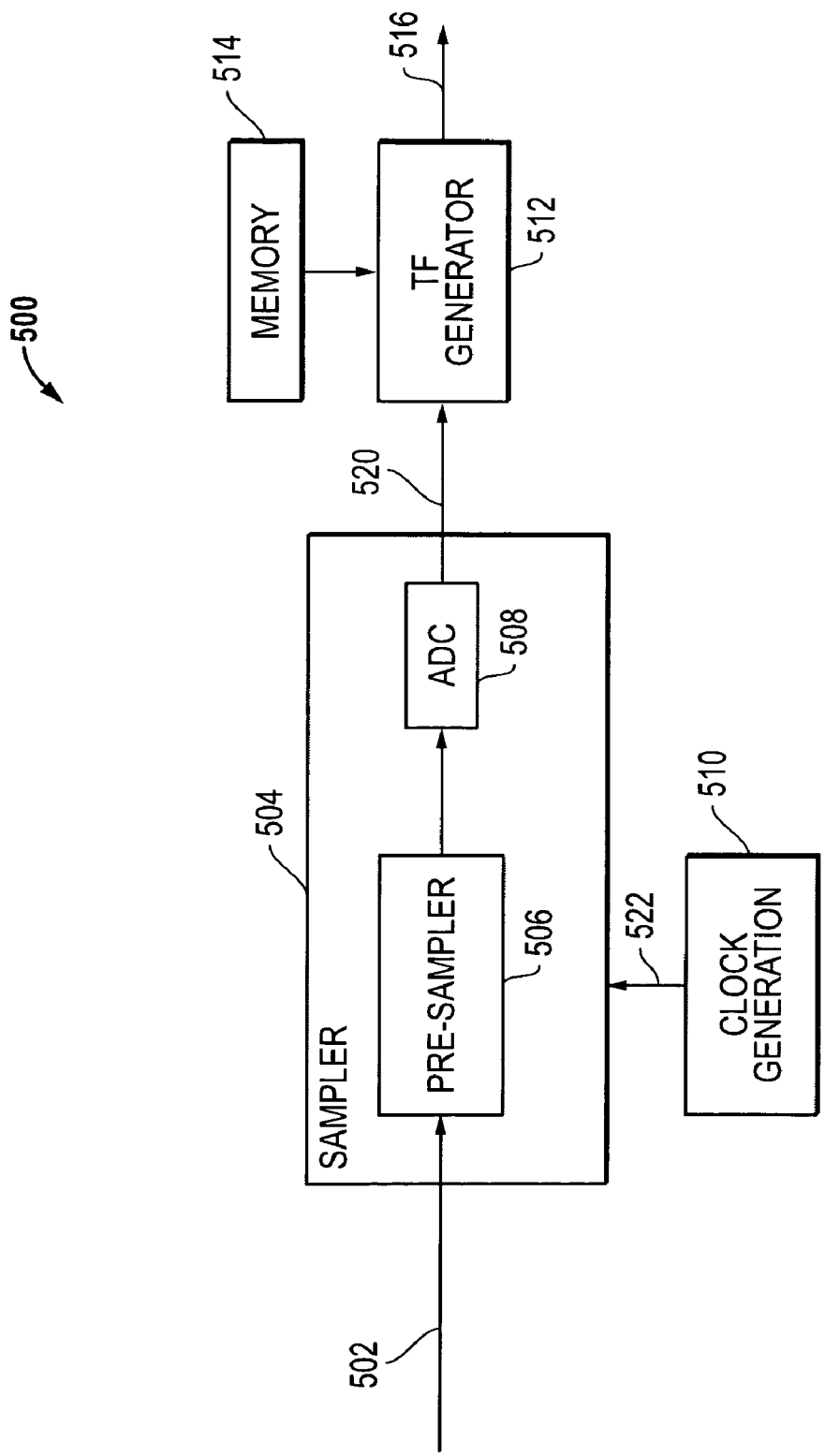
FIG. 5 is a simplified block diagram of an signal receiving and processing system according to exemplary embodiment of the disclosed systems and methods.

FIG. 5 is a simplified block diagram of an signal receiving and processing system 500 according to exemplary embodiment of the disclosed systems and methods that may be employed to implement the methodology illustrated and described in relation to FIGS. 1 and 2, it being understood that any other system configuration may be alternately employed that is suitable for implementing methodology illustrated and described in relation to FIGS. 1 and 2. Signal receiving and processing system 500 may be provided, for example, as a part of an electromagnetic or acoustic surveillance system, or for a structural health monitoring system. Moreover, functionalities of receiving system 500 of FIG. 5 and/or methodologies of FIGS. 1 and 2 may be implemented using a computer program of instructions embodied in a tangible computer readable medium, with the computer program including instructions when executed that are configured to perform one or more of the functionalities of receiving system 500 and/or steps of FIGS. 1 and 2. Further information on signal reception and processing components and uses therefor may be found in U.S. patent application Ser. No. 11/247,314; U.S. patent application Ser. No. 11/247,338; U.S. patent application Ser. No. 11/545,310; U.S. patent application Ser. No. 11/545,642 and U.S. patent application Ser. No. 11/545,641; each of the foregoing patent applications being incorporated herein by reference in its entirety.

As shown in FIG. 5, sampling circuitry 504 of signal receiving and processing system 500 is configured to receive analog input datastream 502 (e.g., an electromagnetic signal datastream such as RF signal datastream, acoustic signal datastream, etc.) collected from any suitable signal source including, but not limited to, electromagnetic (e.g., radio frequency) antenna or phased array antenna or beamformer, microphone or sonar array, ultrasonic array, radar array, seismic array, etc. Analog input datastream 502 may be continuously received in real time from its signal source and processed in real time by the following components of signal receiving and processing system 500.

Sampler or sampling circuitry 504 of FIG. 5 may include a high speed analog pre-sampler 506 and analog-to-digital converter (ADC) circuitry 508 as shown. As so implemented, sampler 504 may be configured to randomly or otherwise non-constantly sample a set of samples to form a non-constantly sampled datastream 102. Sampler 504 may also receive a clock input signal 522 from clock generation circuitry 510 that is utilized by sampler 504 to track and assign a sample time to each of the collected samples of the datastream, e.g., datastream 102 of FIG. 1. It will be understood that sampler or sampling circuitry 504 may additionally or alternatively be configured to constantly sample a set of samples to form a constantly sampled datastream that may be otherwise processed in the same manner as described herein for a non-constantly sampled datastream 102.

Still referring to FIG. 5, digital output signals 520 may be provided from sampler 504 to TF generator circuitry 512. In this regard, digital output signals 520 may include a non-constantly sampled datastream 102 and the sample times for each of the samples contained in the datastream 102. TF generator circuitry 512 may be configured to in turn extract a current integration window 104 of the non-constant samples and their respective sample times from the digital output signals 520 in a manner as described for step 206 of FIG. 2. TF generator circuitry 512 may also be configured to utilize the sample times of the non-constant samples of the current integration window 104 to construct a template set T(f,t) for the current integration time window 104 in a manner as described for steps 212 and 214 of FIG. 2, and to then compare the collected actual sampled measurements D(t) to the constructed template set T(f,t) in a manner as described for step 210 of FIG. 2 to determined if the frequency of one of the templates of the constructed template set T(f,t) matches an actual signal that is contained within the actual sampled measurements.

TF generator circuitry 512 of FIG. 5 may also be configured to repeatedly process and stack successive integration time windows 104 to produce a time-frequency surface from the non-constantly spaced input data in a manner as described in relation to FIGS. 2 and 6-8. Further, TF generator circuitry 512 of FIG. 5 may also be configured to produce likelihood of detection information, to generate autodetected signal frequency information, and/or to produce a time-frequency surface matrix L(t,f) for output (e.g., to a user via display and/or print-out, to storage media, to further processing components for further processing, etc.) via one or more TF output signals 516. TF generator circuitry 512 may also be configured to automatically detect one or more signals contained within input datastream 502 based on results of comparison between the collected actual sampled measurements D(t) and the constructed template set T(f,t), and to optionally so indicate to a user, e.g., via output frequency value or other suitable information for identifying the signal. The presence of one or more signals detected by the disclosed systems and methods may also be indicated in the matrix data of generated time-frequency surface matrix L(t,f) as one or more lines overlaying the matrix background (e.g., see FIGS. 6A, 7A, 8A), or as spikes on a time average of the TF surface (e.g., see FIGS. 6B, 7B, 8B). In this regard, data from such a time-frequency surface matrix L(t,f) may be analyzed by a human user and/or processed by algorithm (e.g., internally executed by TF generator 512 or executing by separate processing component) to detect and identify the signals. TF generator circuitry 512 may be implemented, for example, by firmware and/or software executing on digital signal processing (DSP) circuitry, FPGA or other type of ASIC, microprocessor, CPU, etc. or combination thereof. Memory 514 may be present, for example, to store constructed template set T(f,t) for later comparison to sampled measurements D(t).

The following examples are illustrative and should not be construed as limiting the scope of the invention or the claims thereof.

Example 1

Simulated Data Sources with Constant Sampling Grid

Figure 6A:
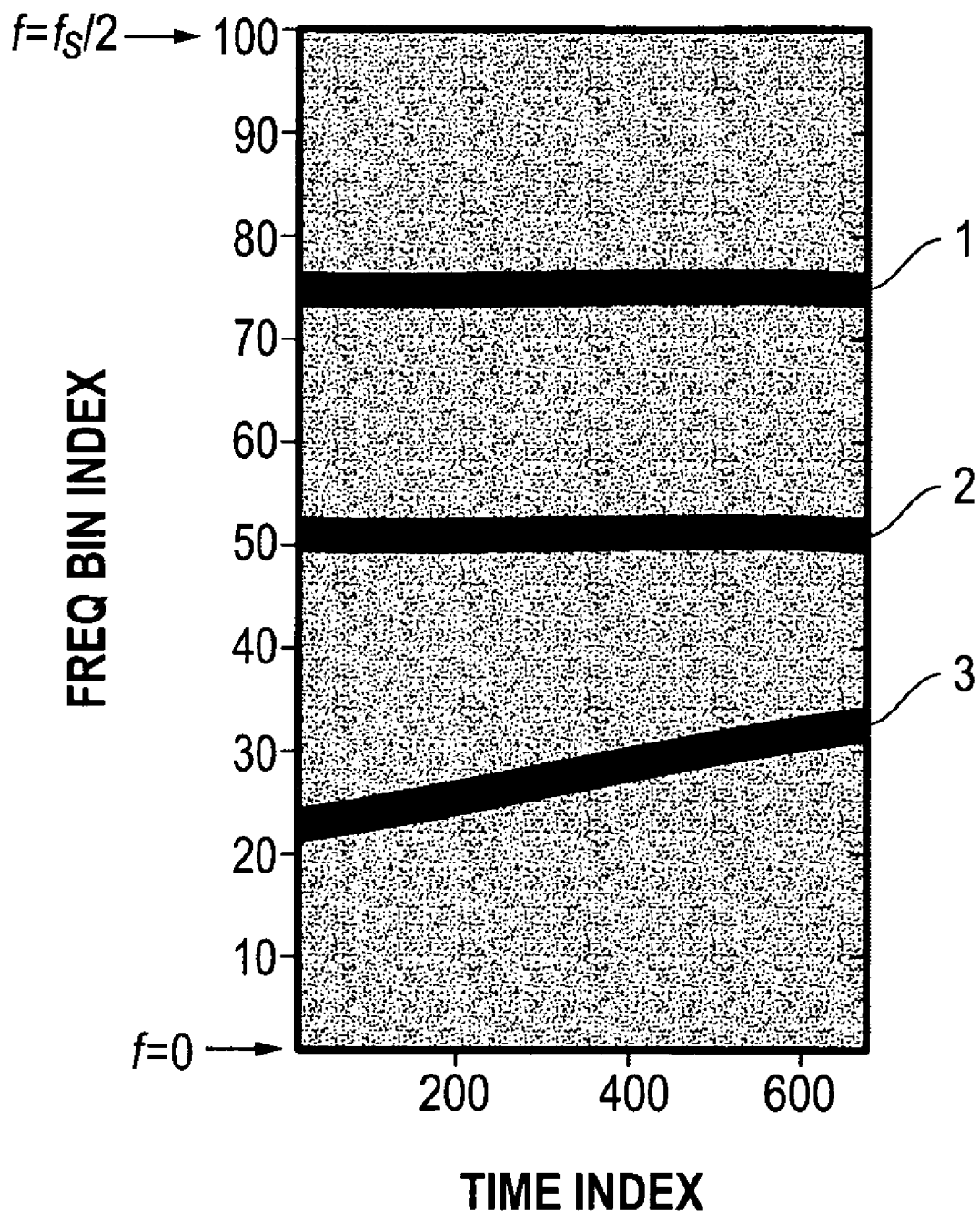
FIG. 6A illustrates a frequency versus time spectrogram of constantly sampled simulated data for Example 1.
Figure 6B:
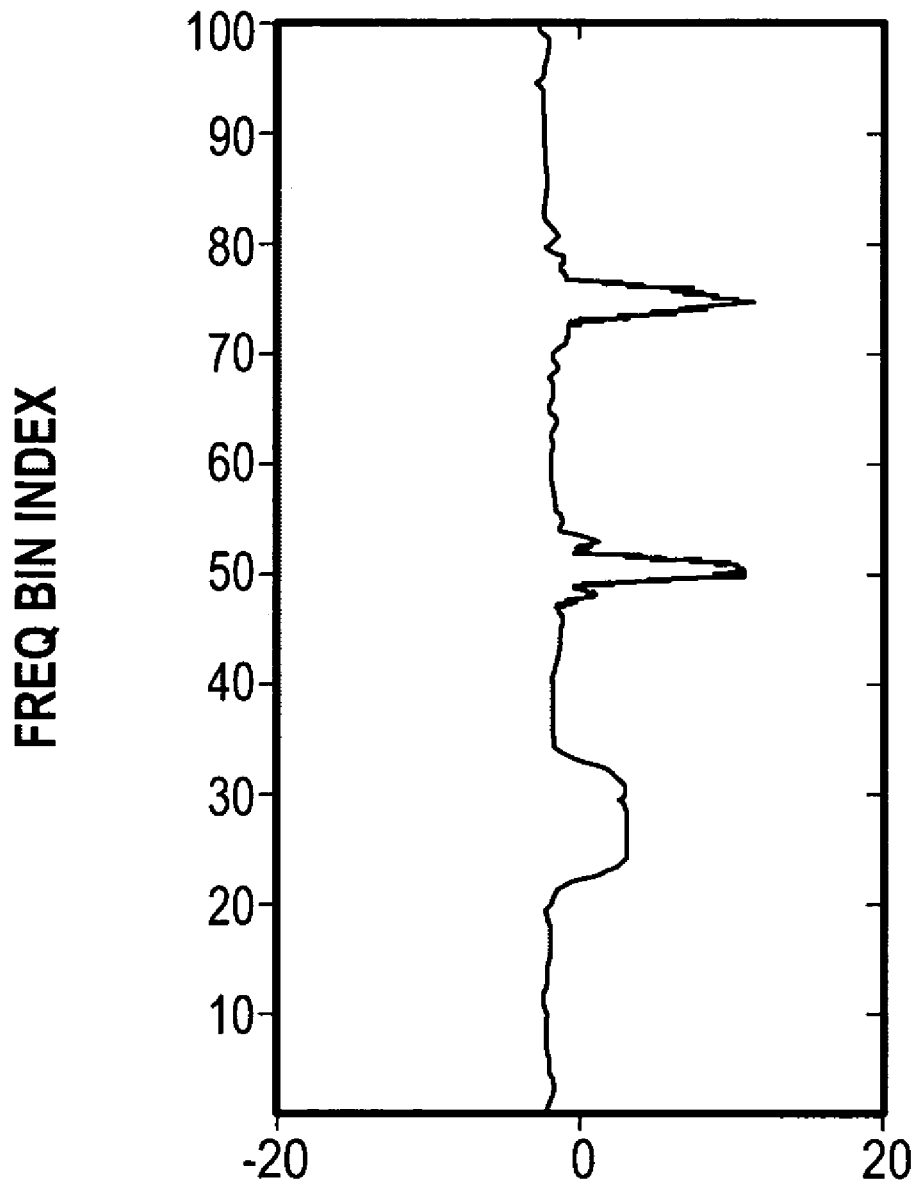
FIG. 6B is a time average of the TF surface of FIG. 6A.

A constant sampling test was carried out with simulated input signal data that contained three simultaneous data signal sources. In the simulation, 131,072 samples were collected at 100 MHz with a bit depth of 3 bits. The first source was a 0 dB CW tone with a frequency of 38 MHz. The second source was a 0 dB CW tone with a frequency of 25.5 MHz. The third source was a 0 dB FM chirp with a frequency that swept from 11 and 16 MHz. The signals were all inserted into a background of white Gaussian noise with signal to noise ratio (SNR) of 0 dB. In the analysis, short-time Fourier Transforms were applied to the data to generate time-frequency surfaces (spectrograms), depicted in FIGS. 6a, 7a, and 8a. FIG. 6A depicts a spectrogram for the constantly sampled full set of simulated data, with 100 frequency bins equally spaced 0 to the Nyquist frequency of 50 MHz. In the spectrogram of FIG. 6A, the three data sources are clear and indicated by dark lines. FIG. 6B is a time average of the TF surface of FIG. 6A, clearly showing spectral peaks associated with the CW sources and a broad maximum generated by the chirped signal.

Example 2

Randomly Sub-Sampled Data Using Streaming Time-Frequency (TF) Methodology

Figure 7A:
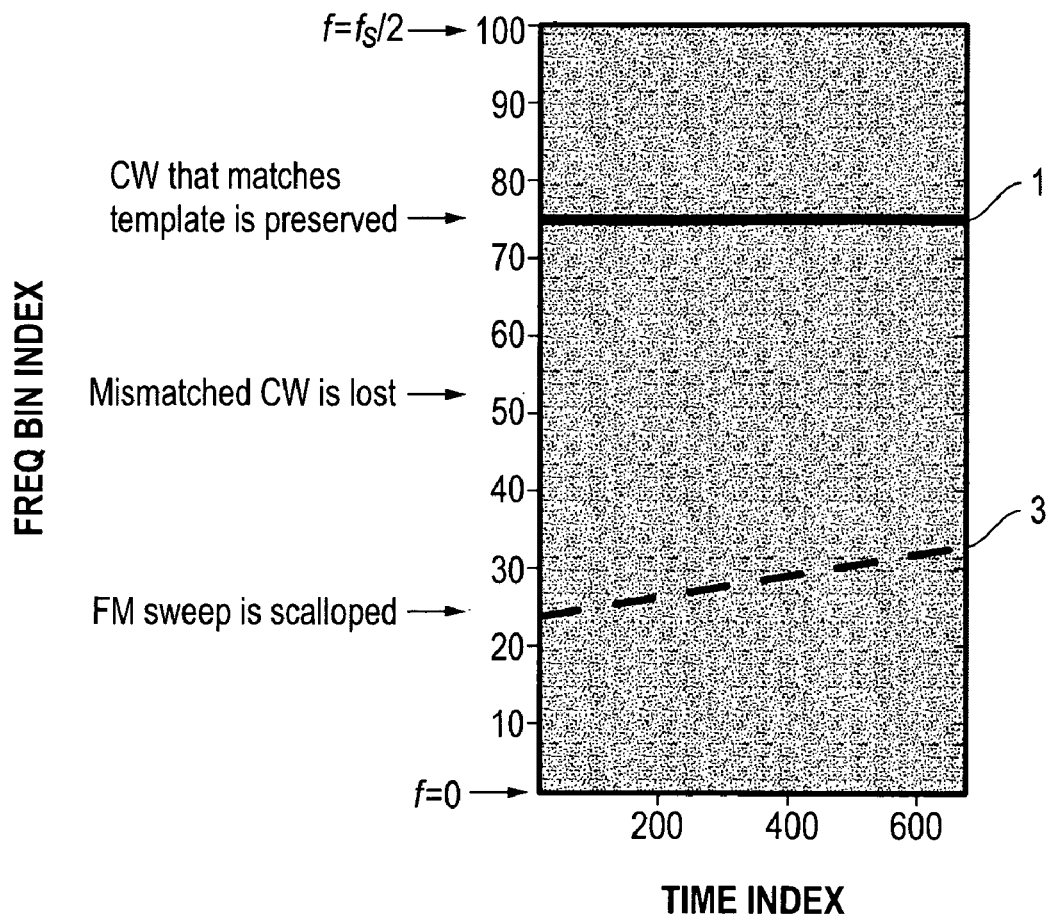
FIG. 7A illustrates a time-frequency surface generated according to one exemplary embodiment of the disclosed systems and methods for Example 2.
Figure 7B:
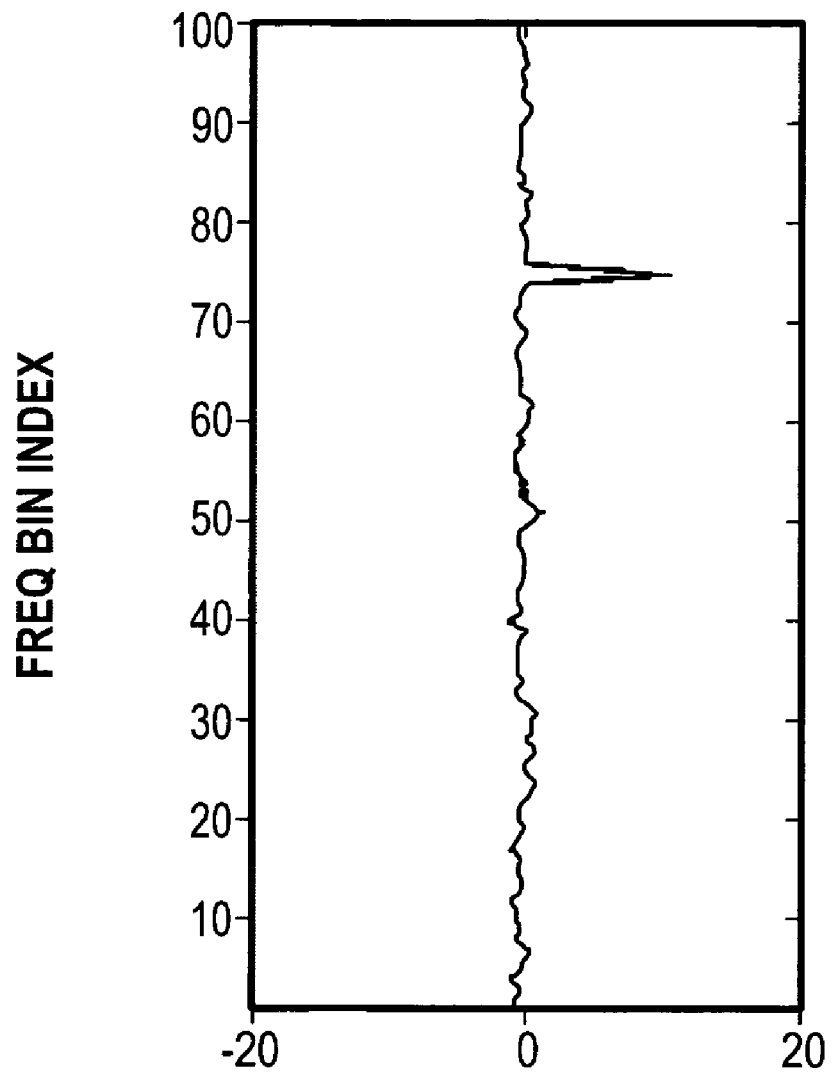
FIG. 7B is a time average of the TF surface of FIG. 7A.

A randomly-subsampled version of the simulated input signal data of Example 1 was extracted for streaming time-frequency analysis by random decimation, i.e., by randomly selecting 10% of the original samples of the input signal data. As in FIG. 6, 100 frequency bins were selected, with equal spacing between 0 and 50 MHz. A time integration window of 50 samples was chosen. FIG. 7A depicts the TF surface generated using the methodology described and illustrated herein in relation to FIG. 2. FIG. 7B is a time average of the TF surface of FIG. 7A. The first CW tone source is preserved in FIGS. 7A and 7B because it matches the template spacing in a manner as illustrated and described in relation to FIG. 4. The second CW tone source is lost due to frequency scalloping in FIGS. 7A and 7B because it lies between templates in a manner as illustrated and described in relation to FIG. 3. The third signal (the chirped source) generates a dotted trace in FIG. 7a. This is caused by scalloping loss; as the signal sweeps from 11 to 16 MHz, it passes between template frequencies. In these regions, response is low because of the template/signal mismatch. In the time-averaged spectrum of FIG. 7B, the chirp signal is obscured because of the scalloping loss.

Example 3

Randomly Sub-Sampled Data Using Streaming Time-Frequency (TF) Methodology with Reduced Integration Times to Mitigate Frequency Scalloping Loss A randomly-subsampled version of the simulated input signal data of Example 1 was again extracted for streaming time-frequency analysis by random decimation, i.e., by randomly selecting 10% of the original samples of the input signal data. For the analysis of this example, 100 frequency bins were once again selected, with equal spacing between 0 and 50 MHz. A reduced integration length of 11 samples was chosen to coarsen frequency-domain and reduce frequency scalloping loss. This reduced length was determined based on a relationship between integration time τ and frequency-bin separation Δf for 50% scalloping loss. This was derived previously above:

$$\tau = \frac{0.604}{\Delta f}$$

For 100 frequency bins distributed between 0 and 50 MHz, Δf is 0.5 MHz, resulting in a value for τ of 1.2 μs. The original sample rate of 100 MHz was randomly decimated to 10% of its original value, resulting in a mean sample rate $f_s$ of 10 MHz. The number of samples in t is therefore $N=\tau f_s=12$. In order to keep the scalloping loss smaller than 50%, an integration length of 11 samples was therefore used in the example of FIG. 8.

Figure 8A:
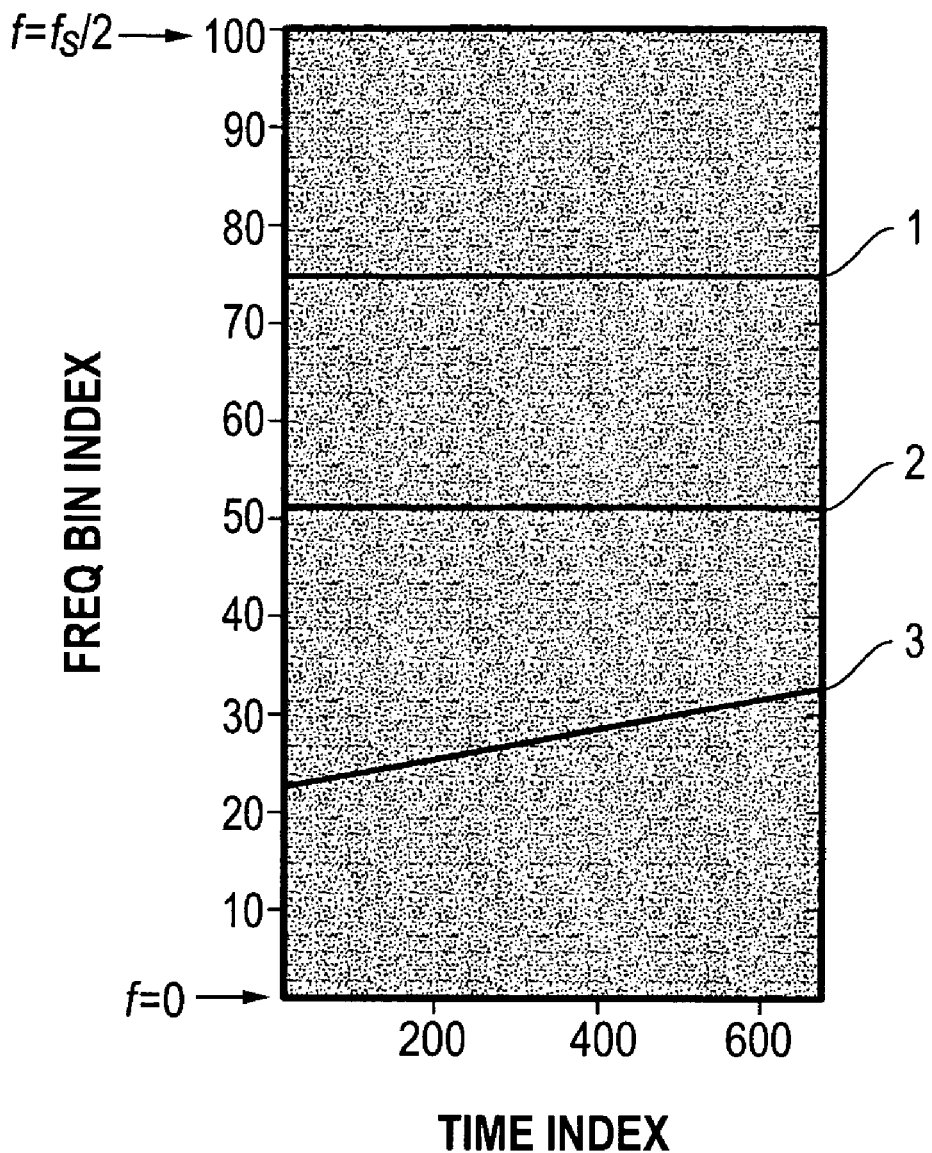
FIG. 8A illustrates a time-frequency surface generated according to one exemplary embodiment of the disclosed systems and methods for Example 3.
Figure 8B:
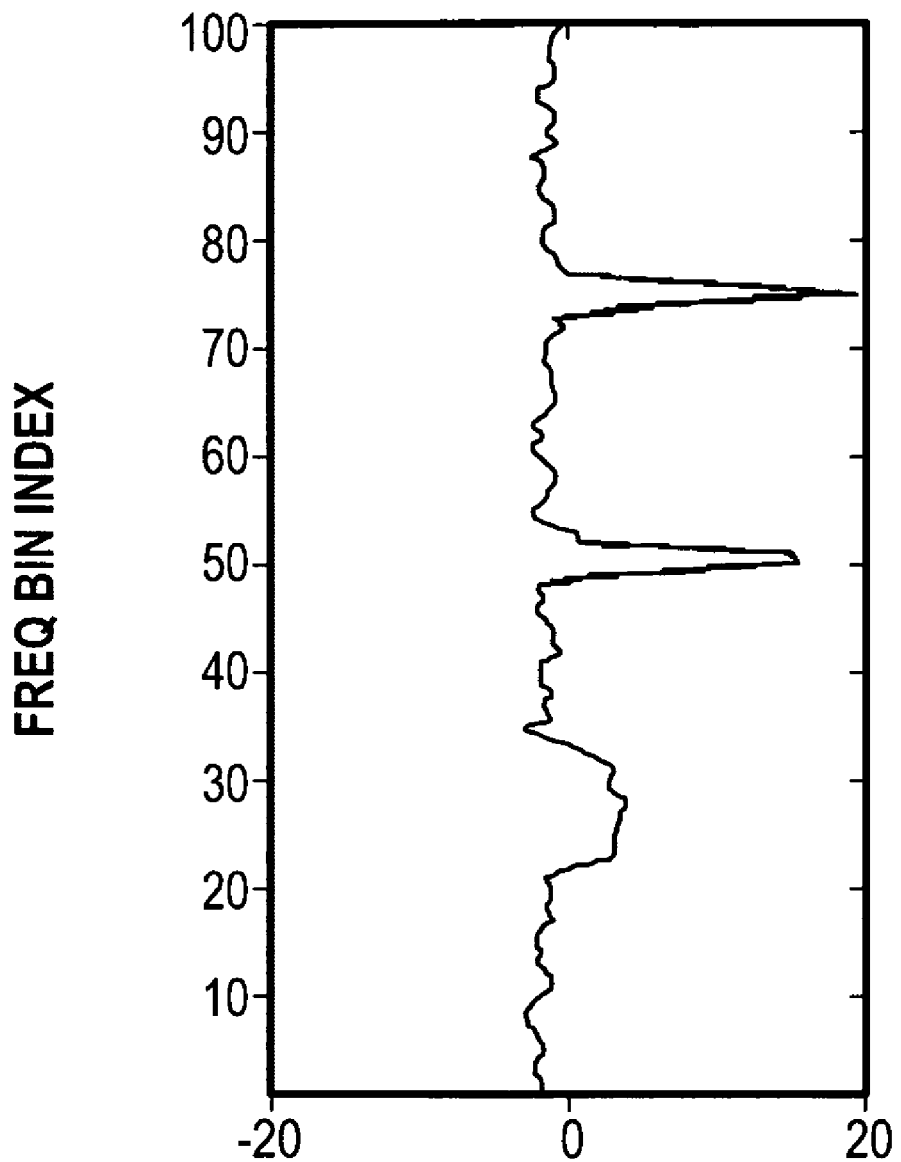
FIG. 8B is a time average of the TF surface of FIG. 8A.

FIG. 8A depicts the TF surface generated using the 11-sample integration times for scalloping loss reduction. FIG. 8B is a time average of the TF surface of FIG. 8A. As may be seen, all three data signal sources are clearly visible in the TF surface of FIG. 8A. Since the optimized templates for Example 3 are significantly shorter (11 samples) than for Example 2 (50 samples), processing gain is reduced for Example 3. In this regard, the processing gain was reduced by 10 log(11/50)=−5.8 dB.

Optional Speckle Suppression Processing

FIGS. 6A, 7A and 8A are TF surfaces generated without any processing to suppress speckling. However, it will be understood that such TF surfaces may be optionally processed to suppress speckling using speckle suppressing processing techniques described in F. Boyle, "*Image Enhancement Techniques for Underwater Acoustic Displays,*" U.S. Navy J Underwater Acoust. 54, 605-622 (2004). Using this methodology, a family of path integrals may be computed at each pixel along short line segments with tilt angles that span 180 degrees, e.g. full set of 90 kernels with tilt angles from 2 degrees to 180 degrees. A family of kernel matrices may be constructed that describe the line segments, and the data matrix may be convolved with each kernel to compute estimates of the integrals. Each pixel may be assigned a new level equal to the maximum from all the integrals and pixels lying along tracks are enhanced.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A signal receiving and processing system, comprising:
   sampling circuitry configured to receive an analog input datastream and to sample a set of samples from said analog input datastream to form a sampled datastream, said sampling circuitry also being configured to output a digital output signal that includes said sampled datastream and the sample times for each of the samples contained in the sampled datastream; and
   time-frequency (TF) generator circuitry coupled to receive said digital output signal from said sampling circuitry, said TF generator circuitry being configured to:
   (a) extract a first window of samples from said sampled datastream such that said first window of samples only contains a first portion of said samples of said datastream and such that each of said samples of said first window having a sample measurement D(t) and a sample time associated therewith,
   (b) construct a first set of time-frequency templates T(f, t) such that each individual template of said first set of time-frequency templates T(f,t) is constructed for a given template frequency versus said sample times of said samples contained within said extracted first window of samples,
   (c) compare the set of sample measurements D(t) from said first window of samples to each of said time-frequency templates of said first set of time-frequency templates T(f,t) by correlating the set of sample measurements D(t) from said first window with each of said time-frequency templates of said first set of time-frequency templates T(f,t), and
   (d) determine a correlation amplitude based on said comparison for each given one of said time-frequency templates of said first set of time-frequency templates T(f,t) such that the correlation amplitude represents the degree of correlation between each given one of said first set of time-frequency templates T(f,t) and said set of sample measurements D(t) from said first window relative to the degree of correlation between other of said time-frequency templates of said first set of time-frequency templates T(f,t) and said set of sample measurements D(t) from said first window.

2. The system of claim 1, wherein said TF generator circuitry is further configured to:
   (e) determine the time-frequency template of said first set of time-frequency templates T(f,t) that has the greatest determined correlation amplitude among all of said first set of time-frequency templates T(f,t); and
   (f) select a frequency of said time-frequency template of said first set of time-frequency templates T(f,t) having said greatest determined correlation amplitude as the frequency of a signal within said first window.

3. The system of claim 2, wherein said TF generator circuitry is further configured to:
   (g) repeat said steps (a) through (f) for at least one additional window of samples to select a frequency of a signal within said at least one additional window of samples, said at least one additional widow of samples containing only a second portion of said samples of said datastream that is different than said first portion of said samples of said datastream; and (h) stack said selected frequencies of said first window and said at least one additional window to produce a time-frequency surface matrix L(t,f).

4. The system of claim 1, wherein said input signal data comprises RF signal data collected continuously and in real time from a RF signal source; and wherein said steps (a) through (d) are performed continuously in real time as said RF signal data is continuously collected in real time.

5. The system of claim 1, wherein said sampling circuitry is further configured to non-constantly sample said set of samples from said analog input datastream to form said sampled datastream as a non-constantly sampled datastream.

6. The system of claim 1, wherein said TF generator circuitry is configured to determine said correlation amplitude for each given one of said time-frequency templates of said set of time-frequency templates T(f,t) as the likelihood of signal detection L(f) determined according to the following relation ship:

$$L(f) = \sum_{s=1}^{N} D(t_s) conj(T(f, t_s))$$

where f is the template frequency index, $t_s$ is the time sample index, $D(t_s)$ is the signal measurement, $T(f,t_s)$ is the template, and N is the number of samples within said current window.

7. The system of claim 1, wherein said TF generator circuitry is configured to construct said first set of time-frequency templates T(f,t) such that each individual template of said first set of time-frequency templates T(f,t) overlaps in frequency with at least one other of said templates of said first set of time-frequency templates T(f,t).

8. The system of claim 7, wherein said TF generator circuitry is configured to determine a length of integration time window for said first window of samples prior to performing said steps (a) though (d); said length of integration of said time window being such that each individual template of said first set of time-frequency templates T(f,t) overlaps in frequency with at least one other of said templates of said first set of time-frequency templates T(f,t).

9. The system of claim 8, wherein said TF generator circuitry is configured to determine a length of integration time window for said first window of samples according to the following relationship:

$$\tau = \frac{0.604}{\Delta f}$$

where τ is the integration time window length, and where $\Delta f = (f_0 - f)$ is the mismatch between the template frequency and the signal.

10. A signal receiving and processing system, comprising: sampling circuitry configured to receive an analog input datastream and to sample a set of samples from said analog input datastream to form a sampled datastream, said sampling circuitry also being configured to output a digital output signal that includes said sampled datastream and the sample times for each of the samples contained in the sampled datastream; and time-frequency (TF) generator circuitry coupled to receive said digital output signal from said sampling circuitry, said TF generator circuitry being configured to:

(a) divide a first window of samples into at least two smaller sets of samples, said first window of samples containing only a first portion of said samples of said datastream and each of said samples of said first window having a sample measurement D(t) and a sample time associated therewith.

(b) construct a first set of time-frequency templates T(f, t) such that each individual template of said first set of time-frequency templates T(f,t) is constructed for a given template frequency versus said sample times of said samples contained within a first one of said smaller sets of samples, (c) construct a second set of time-frequency templates T(f,t) such that each individual template of said second set of time-frequency templates T(f,t) is constructed for a given template frequency versus said sample times of said samples contained within a second one of said smaller sets of samples, (d) compare the set of sample measurements D(t) from said first smaller set of samples to each of said time-frequency templates of said first set of time-frequency templates T(f,t)) by correlating the set of sample measurements D(t) from said first smaller set of samples with each of said time-frequency templates of said first set of time-frequency templates T(f,t), (e) compare the set of sample measurements D(t) from said second smaller set of samples to each of said time-frequency templates of said second set of time-frequency templates T(f,t) by correlating the set of sample measurements D(t) from said second smaller set of samples with each of said time-frequency templates of said second set of time-frequency templates T(f,t), (f) determine a correlation amplitude based on said comparison for each given one of said time-frequency templates of said first set of time-frequency templates T(f,t) such that said correlation amplitude represents the degree of correlation between each given one of said first set of time-frequency templates T(f,t) and said set of sample measurements D(t) from said first smaller set of samples to the degree of correlation between other of said time-frequency templates of said first set of time-frequency templates T(f,t) and said set of sample measurements D(t) from said first smaller set of samples, (g) determine a correlation amplitude based on said comparison for each given one of said time-frequency templates of said second set of time-frequency templates T(f,t) such that said correlation amplitude representing the degree of correlation between each given one of said second set of time-frequency templates T(f, t) and said set of sample measurements D(t) from said second smaller set of samples to the degree of correlation between other of said time-frequency templates of said second set of time-frequency templates T(f,t) and said set of sample measurements D(t) from said second smaller set of samples, and (h) incoherently add together said correlation amplitudes determined in steps (f) and (g).

11. The system of claim 10, wherein said TF generator circuitry is configured to:

(i) determine the time-frequency template of said first and second sets of time-frequency templates T(f,t) that has the greatest determined correlation amplitude among all of said first and second sets of time-frequency templates T(f,t); and (j) select a frequency of said time-frequency template of said first and second sets of time-frequency templates T(f,t) having said greatest determined correlation amplitude as the frequency of a signal within said first window.

12. The system of claim 11, wherein said TF generator circuitry is configured to:

(k) then repeat said steps (a) through (h) for at least one additional window of samples to select a frequency of a signal within said at least one additional window of samples, said at least one additional window of samples containing only a second portion of said samples of said datastream that is different than said first portion of said samples of said datastream; and (l) stack said selected frequencies of said first window and said at least one additional window to produce a time-frequency surface matrix L(t,f).

13. A method of time-frequency (TF) processing input signal data, comprising:

(a) receiving said input signal data;

(b) utilizing sampling circuitry to sample said input signal data to form a datastream of sampled data;

(c) utilizing TF generator circuitry to extract a first window of samples from said datastream, said first window of samples containing only a first portion of said samples of said datastream and each of said samples of said first window having a sample measurement D(t) and a sample time associated therewith;

(d) constructing a first set of time-frequency templates T(f,t), each individual template of said first set of time-frequency templates T(f,t) being constructed for a given template frequency versus said sample times of said samples contained within said extracted first window of samples;

(e) comparing the set of sample measurements D(t) from said first window of samples to each of said time-frequency templates of said first set of time-frequency templates T(f,t) by correlating the set of sample measurements D(t) from said first window with each of said time-frequency templates of said first set of time-frequency templates T(f,t); and (f) determining a correlation amplitude based on said comparison for each given one of said time-frequency templates of said first set of time-frequency templates T(f,t), said correlation amplitude representing the degree of correlation between each given one of said first set of time-frequency templates T(f,t) and said set of sample measurements D(t) from said first window relative to the degree of correlation between other of said time-frequency templates of said first set of time-frequency templates T(f,t) and said set of sample measurements D(t) from said first window;

wherein said steps (d) through (f) are performed by utilizing TF generator circuitry.

14. The method of claim 13, further comprising the steps of:

(g) determining the time-frequency template of said first set of time-frequency templates T(f,t) that has the greatest determined correlation amplitude among all of said first set of time-frequency templates T(f,t); and (h) selecting a frequency of said time-frequency template of said first set of time-frequency templates T(f,0 having said greatest determined correlation amplitude as the frequency of a signal within said first window;

wherein said steps (g) through (h) are performed by utilizing TF generator circuitry.

15. The method of claim 14, further comprising the steps of: (i) then repeating said steps (c) through (h) for at least one additional window of samples to select a frequency of a signal within said at least one additional window of samples, said at least one additional window of samples containing only a second portion of said samples of said datastream that is different than said first portion of said samples of said datastream; and (j) stacking said selected frequencies of said first window and said at least one additional window to produce a time-frequency surface matrix L(t,f);

wherein said steps (i) through (j) are performed by utilizing TF generator circuitry.

16. The method of claim 13, wherein said input signal data comprises RF signal data collected continuously and in real time from a RF signal source; and wherein said steps (b) through (f) are performed repeatedly and continuously in real time as said RF signal data is continuously collected in real time.

17. The method of claim 13, wherein said datastream comprises a datastream of non-constantly sampled data; and wherein step (b) comprises non-constantly sampling said input signal data to form said datastream of non-constantly sampled data.

18. The method of claim 13, wherein said correlation amplitude for each given one of said time-frequency templates of said set of time-frequency templates T(f,0 is the likelihood of signal detection Lff) determined according to the following relationship:

$$L(f) = \sum_{s=1}^{N} D(t_s) conj(T(f, t_s))$$

Where f is the template frequency index, $t_s$ is the time sample index, $D(t_s)$ is the signal measurement, $T(f,t_s)$ is the template, and N is the number of samples within said current window.

19. The method of claim 13, wherein step (d) further comprises constructing said first set of time-frequency templates T(f,t) such that each individual template of said first set of time-frequency templates T(f,t) overlaps in frequency with at least one other of said templates of said first set of time-frequency templates T(f,t).

20. The method of claim 19, further comprising determining a length of integration time window for said first window of samples prior to performing said steps (c) though (f); said length of integration of said time window being such that each individual template of said first set of time-frequency templates T(f,t) overlaps in frequency with at least one other of said templates of said first set of time-frequency templates T(f,t).

21. The method of claim 20, further comprising determining a length of integration time window for said first window of samples according to the following relationship:

$$\tau = 0.604/\Delta f$$

where τ is the integration time window length, and where $\Delta f = (f_0 - f)$ is the mismatch between the template frequency and the signal.

22. A method of time-frequency (TF) processing input signal data, comprising:
  (a) receiving said input signal data;
  (b) sampling said input signal data to form a datastream of sampled data;
  (c) utilizing TF generator circuitry to extract a first window of samples from said datastream, said first window of samples containing only a first portion of said samples of said datastream and each of said samples of said first window having a sample measurement D(t) and a sample time associated therewith;
  (d) dividing said first window of samples into at least two smaller sets of samples;
  (e) constructing a first set of time-frequency templates T(f,t), each individual template of said first set of time-frequency templates T(f,t) being constructed for a given template frequency versus said sample times of said samples contained within a first one of said smaller sets of samples;
  (f) constructing a second set of time-frequency templates T(f,t), each individual template of said second set of time-frequency templates T(f,t) being constructed for a given template frequency versus said sample times of said samples contained within a second one of said smaller sets of samples;
  (g) comparing the set of sample measurements D(t) from said first smaller set of samples to each of said time-frequency templates of said first set of time-frequency templates T(f,t) by correlating the set of sample measurements D(t) from said first smaller set of samples with each of said time-frequency templates of said first set of time-frequency templates T(f,t);
  (h) comparing the set of sample measurements D(t) from said second smaller set of samples to each of said time-frequency templates of said second set of time-frequency templates T(f,t) by correlating the set of sample measurements D(t) from said second smaller set of samples with each of said time-frequency templates of said second set of time-frequency templates T(f,t);
  (i) determining a correlation amplitude based on said comparison for each given one of said time-frequency templates of said first set of time-frequency templates T(f,t), said correlation amplitude representing the degree of correlation between each given one of said first set of time-frequency templates T(f,t) and said set of sample measurements D(t) from said first smaller set of samples to the degree of correlation between other of said time-frequency templates of said first set of time-frequency templates T(f,t) and said set of sample measurements D(t) from said first smaller set of samples;
  (j) determining a correlation amplitude based on said comparison for each given one of said time-frequency templates of said second set of time-frequency templates T(f,t), said correlation amplitude representing the degree of correlation between each given one of said second set of time-frequency templates T(f,t) and said set of sample measurements D(t) from said second smaller set of samples to the degree of correlation between other of said time-frequency templates of said second set of time-frequency templates T(f,t) and said set of sample measurements D(t) from said second smaller set of samples; and
  (k) incoherently adding together said correlation amplitudes determined in steps (i) and (j);
  wherein said steps (d) through (k) are performed by utilizing the TF generator circuitry.

23. The method of claim 22, further comprising the steps of:
  (l) determining the time-frequency template of said first and second sets of time-frequency templates T(f,t) that has the greatest determined correlation amplitude among all of said first and second sets of time-frequency templates T(f,t); and
  (m) selecting a frequency of said time-frequency template of said first and second sets of time-frequency templates T(f,t) having said greatest determined correlation amplitude as the frequency of a signal within said first window;
  wherein said steps (l) through (m) are performed by utilizing TF generator circuitry.

24. The method of claim 23, further comprising the steps of:
  (n) then repeating said steps (d) through (k) for at least one additional window of samples to select a frequency of a signal within said at least one additional window of samples, said at least one additional window of samples containing only a second portion of said samples of said data stream that is different than said first portion of said samples of said datastream;
  and (o) stacking said selected frequencies of said first window and said at least one additional window to produce a time-frequency surface matrix L(t,f);
  wherein said steps (n) through (o) are performed by utilizing TF generator circuitry.

* * * * *

UNITED STATES PATENT AND TRADEMARK OFFICE
CERTIFICATE OF CORRECTION

| | | |
|---|---|---|
| PATENT NO. | : 8,121,222 B2 | Page 1 of 1 |
| APPLICATION NO. | : 12/214897 | |
| DATED | : February 21, 2012 | |
| INVENTOR(S) | : Frank Boyle et al. | |

It is certified that error appears in the above-identified patent and that said Letters Patent is hereby corrected as shown below:

Col. 18,
In line 3 of claim 18, delete "T(f,0," and insert --T(f,t)--.

Col. 18,
In line 4 of claim 18, delete "Lff)" and insert --L(f)--.

Signed and Sealed this
Seventeenth Day of April, 2012

David J. Kappos
*Director of the United States Patent and Trademark Office*

UNITED STATES PATENT AND TRADEMARK OFFICE
CERTIFICATE OF CORRECTION

PATENT NO. : 8,121,222 B2
APPLICATION NO. : 12/214897
DATED : February 21, 2012
INVENTOR(S) : Frank Boyle et al.

It is certified that error appears in the above-identified patent and that said Letters Patent is hereby corrected as shown below:

Col. 18, line 31 (Claim 18, line 3)
delete "T(f,0," and insert --T(f,t)--.

Col. 18, line 32 (Claim 18, line 4)
delete "Lff)" and insert --L(f)--.

This certificate supersedes the Certificate of Correction issued April 17, 2012.

Signed and Sealed this
Eighth Day of May, 2012

David J. Kappos
*Director of the United States Patent and Trademark Office*